May 10, 1949.  C. H. WHITE ET AL  2,470,008
DISK HARROW LATCH UNIT
Filed March 30, 1945
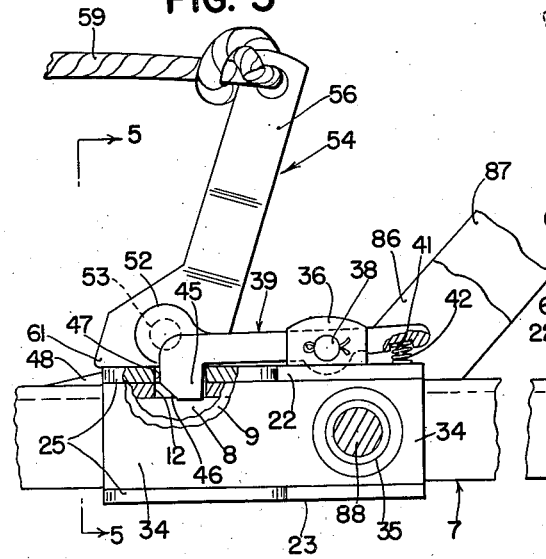
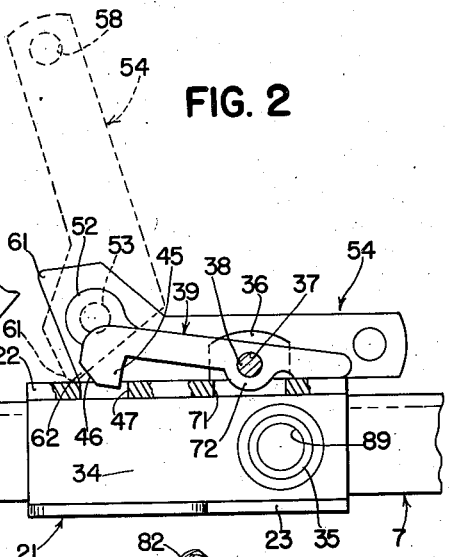
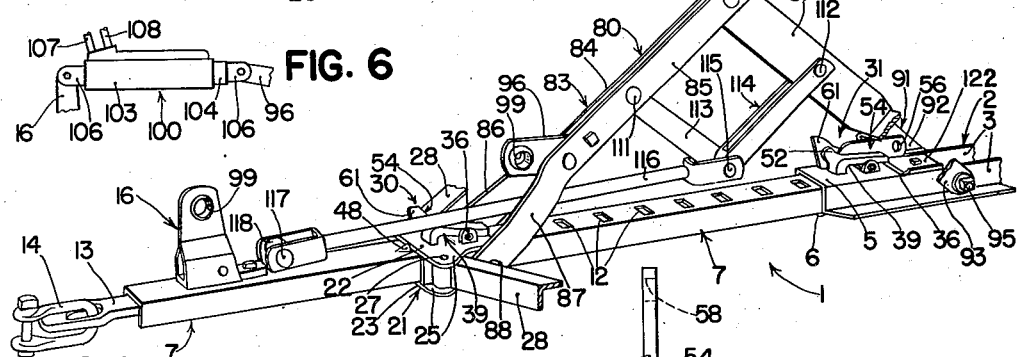
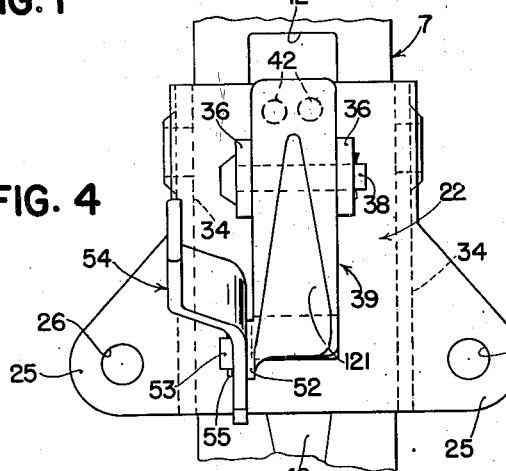
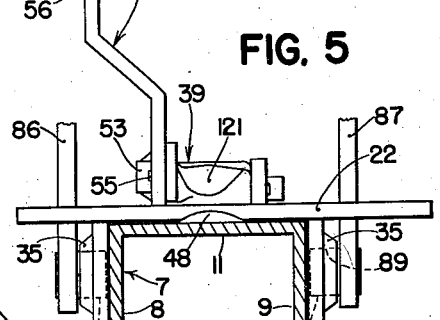
INVENTORS:
CHARLES H. WHITE, WM. P. OEHLER,
CHARLES H. YOUNGBERG
ATTORNEYS
WITNESS Patented May 10, 1949

2,470,008

UNITED STATES PATENT OFFICE 2,470,008

DISK HARROW LATCH UNIT

Charles H. White, William P. Oehler, and Charles H. Youngberg, Moline, Ill., assignors to Deere & Company, Moline, Ill., a corporation of Illinois Application March 30, 1945, Serial No. 585,692

13 Claims. (Cl. 55—81)

The present invention relates generally to agricultural implements and more particularly to disk harrows wherein the control is effected by means that includes latches or the like for holding relatively movable parts, when desired, against relative movement.

The object and general nature of the present invention is the provision of control mechanism for such implements as disk harrows and the like in which provision is made for effecting the desired control either by manually controlled means or by power controlled and/or actuated means. More specifically, it is a feature of this invention to provide an implement, such as a disk harrow, with means making it possible to mount on the implement, for example, on the drawbar, a hydraulic piston and cylinder unit when it is desired to control the implement by hydraulic power, and also making it possible to remove the hydraulic unit and control the harrow by manual means. Still further, it is a feature of this invention to provide a new and improved latch unit for disk harrows or the like which is especially compact and so constructed and arranged as to be out of the way of and not interfere with the hydraulic mechanism or any parts thereof when the implement is to be controlled by hydraulic power. Further, it is a feature of this invention to provide an improved latch unit which incorporates means for disabling or disconnecting the locking parts when using the hydraulic mechanism and for conveniently operating the latches when the harrow is controlled manually. Still further, it is a feature of this invention to provide a latch box which permits movement of one of the parts in one direction, thereby facilitating certain operations when the implement is controlled manually.

These and other objects and advantages of the present invention will be apparent to those skilled in the art after a consideration of the following detailed description, taken in conjunction with the accompanying drawings.

In the drawings:

Figure 1 is a perspective view of the drawbar of a single action disk harrow, in which the principles of the present invention have been incorporated.

Figure 2 is an enlarged side view of one of the latch units, showing the same arranged for hydraulic operation of the harrow.

Figure 3 is a view similar to Figure 2, showing the latch unit arranged for manual operation.

Figure 4 is a top view of the latch unit shown in Figure 3.

Figure 5 is an end view, taken generally along the line 5—5 of Figure 3.

Figure 6 is a diagrammatic view showing the mounting of the cylinder on the drawbar when hydraulic power is utilized for operating and/or controlling the harrow.

Referring now more particularly to Figure 1, the present invention has been shown as incorporated in a single action disk harrow having a drawbar construction, indicated in its entirety by the reference numeral 1, which includes a rear drawbar member 2, preferably made up of a pair of angles 3 fastened together at their forward ends by upper and lower plates 5 and 6. Slidable between the angles 3 and between the upper and lower plates 5 and 6 is a drawbar channel member 7 having side flanges 8 and 9 and a central web section 11 which is apertured, as at 12, and, at its forward end, is provided with a draft receiving member 13 carrying a clevis 14 which is adapted to be hitched to a propelling tractor or other source of power. Fixed to the front end of the channel 7 is a cylinder-receiving bracket 16 to which more detailed reference will be made below.

Mounted for movement longitudinally of the channel member 7 is a forward slide 21 that comprises upper and lower plates 22 and 23, each of which is provided with a pair of apertured ears 25, the openings 26 in which are adapted to receive pivots 27 (Figure 1) to which the forward or inner ends of rearwardly divergent links 28 are connected. The rear end of the rear drawbar 2 is connected to the inner ends of a pair of disk gangs (not shown) and the rear ends of the draft links 28 are connected to the outer end portions of said gangs.

The drawbar construction 1 shown in Figure 1 incorporates two latch units 30 and 31. Essentially, these latch units are substantially identical and therefore a description of one will suffice. As best shown in Figures 2–5, the forward latch unit 30 is mounted on and serves as a part of the front slide 21 while the rear latch unit is mounted on and serves as a part of the forward portion of the rear drawbar 2, as best shown in Figure 1.

Referring now to the forward latch unit, the upper and lower plates 22 and 23 of the forward slide 21 are connected together in spaced apart relation by side members 34 which, at their rear portions, are apertured and shaped to form bearing portions 35. A pair of ears 36 disposed in laterally spaced relation is carried by the upper plate 22 and the ears or lugs 36 are apertured, as at 37 (Figure 2), to receive a pin 38 on which a detent 39 is pivotally mounted intermediate its ends. At its rear end a pair of recesses 41 are formed in the body of the detent so as to receive a pair of springs 42 disposed respectively therein. The springs 42 bear against the rear portion of the upper plate 22 for urging the forward end of the detent 39 downwardly. The forward end of the detent 39 carries an engaging section 45, the nose of which is beveled, as at 46. The engaging section 45 is arranged to extend downwardly through an opening 47 formed in the upper plate 22 and into one of the openings 12 in the channel 7. The latter carries a stop 48 which limits the forward movement of the slide 21 relative to the channel 7. As best shown in Figure 3, one of the openings 12 in the channel is immediately rearwardly of the stop 48.

For moving the detent 39 into and out of a position engaging one or the other of the openings 12 in the channel 7, we provide a lug or extension 52 on one side of the detent or latch dog 39, which extension carries a pivot 53 on which a trip lever 54 is swingably mounted, being held in place by a cotter 55 or the like. The lever 54 is of particular construction. The upper portion 56 is offset laterally outwardly, as best shown in Figure 5, and is provided with an opening 58 in which a cable 59, such as a rope, may be connected. The lower portion of the lever 54 is formed with a pair of spaced apart cam sections 61 and 62 which are disposed generally on opposite sides of the pivot defined by the part 53. When used with the rope or cable 59, as best shown in Figure 3, the lever 54 occupies a generally vertical position, this lever inclined rearwardly a slight amount. A forward pull on the cable 69 brings the cam section 61 down against the plate 22 with consequent upward lifting action through the pivot 53 against the detent or latch dog 39, raising the latter generally into the position shown in Figure 2, the lever occupying the position shown in dotted lines in Figure 2. Normally the springs 42 hold the engaging section 45 of the detent 39 down in engagement with the channel 7. The lever 54 is constructed so that the cam 61 (Figure 2, dotted lines) always remains ahead of the pivot 53 so that the springs 42 will automatically swing the lever 54 back to the position shown in Figure 3 and reenegage the detent or dog 39 with the channel 7. The detent or latch dog 39 may also be moved into its disengaged position by swinging the lever 54 rearwardly so that it moves downwardly substantially flat against the upper plate 22 of the slide, as shown in full lines in Figure 2. To secure this action, the cam 62 is arranged to come substantially underneath and slightly forward of the pivot 53 when the lever 54 is down against the plate 22, so that there is no tendency for the lever 54 to return to a position permitting the latch dog or detent 39 to reengage the channel. In other words, in Figure 2 the lever 54 is shown in an over center position in which the effect of the springs 42 acting against the detent or latch dog 39 is to actually hold the detent lever 54 in a position disengaging the detent or latch dog from the channel 7. It will also be seen from Figure 2 that the upper plate 22 is apertured, as at 71, to accommodate the hub portion 72 of the detent or latch dog 39, permitting a very compact or low mounting of the detent or latch dog.

The rear latch unit 31 is substantially the same construction as described above and hence further description is believed to be unnecessary. Identical parts of the rear latch unit 31 are indicated by reference numerals used to identify the same parts of the forward latch unit 30.

In order to operate the disk harrow, the drawbar structure 1 of which is shown in Figure 1, by hydraulic power, provision is made to support a hydraulic piston and cylinder unit 80 on the drawbar and connect the same through suitable linkage whereby a full stroke of the piston and cylinder unit will separate the drawbar 2 and slide 21, or bring them together, the desired amount, such as, sufficient to swing the gang or gangs of the disk harrow from a full angled position into a full transport or straightened position. The linkage and cylinder mounting shown in Figure 1 is substantially the same in principle as the linkage and cylinder mounting shown in the copending United States patent application, Serial No. 566,790, filed December 6, 1944, by Charles H. White, to which reference may be made if necessary. Briefly, a lazy tongs or pantograph linkage 80 is pivotally connected with the slide 21 and the front portion of the drawbar 2. The linkage 80 consists of a rear arm 81 pivoted at 82, to a forward arm 83, which is made up of two strap members 84 and 85, the forward ends 86 and 87 are offset laterally outwardly and provided with studs 88 that are received in the bearing sections 35 on the forward slide 21, as best shown in Figure 5, bearing sections 35 being apertured, as at 89, for this purpose. The lower or rear end of the arm 81 terminates in a yoke section 91 having laterally spaced parts 92 and 93 apertured to receive pivot members 95 by which the arm 81 is pivotally connected with the forward portion of the rear drawbar member 2. A bracket 96 is fixed to the forward arm 80 and, cooperating with the bracket 16, both of which are apertured, as indicated at 99, provides means for detachably receiving a piston and cylinder unit 100, which is shown in attached position in Figure 6. The piston and cylinder unit or ram 100 is more or less of conventional construction, so far as the present invention is concerned, comprising a cylinder 103 and a piston unit 104, each having apertured lugs 106 by which, through the use of quick detachable pins or the like, are adapted to be readily connected to or disconnected from the brackets 16 and 96. A pair of hose lines 107 and 108 lead from the ram 100 to a controlled hydraulic unit preferably mounted on the tractor. The two arms 81 and 83 of the linkage 80 are apertured at an intermediate point to receive pivots 111 and 112 by which a pair of intermediate links 113 and 114 may be connected thereto. The links 113 and 114 are pivotally connected together by a pin 115 or the like, which can also receive the rear end of an anchoring link 116, the forward end of which is pivoted, as at 117, to a lug or bracket 118 carried by the front portion of the channel 7. When the ram unit 100 is connected to the brackets 16 and 96 and is extended or retracted, the front slide 21 and the rear drawbar member 2 are brought together or separated one from the other for angling and straightening the harrow. The function of the anchoring link 116 is to divide the total movement of the slide 21 relative to the drawbar 2 so that when the slide is moved along the channel 7 in one direction the drawbar 2 is shifted substantially the same amount along the rear portion of the channel 7. As will be clear from Figure 1, the anchoring link 116, in order to provide a compact arrangement, is mounted so as to underlie the ram or cylinder unit 100. This brings the link 116 fairly close to the detent or latch dog 39, and in order to prevent interference between these parts the latch dog or detent 39 is provided with a recessed upper space 121. In order to permit the above-mentioned relative movement by use of the hydraulic unit 100, it is necessary that both the drawbar member 2 and the slide 21 be free to move relative to the channel 7. Therefore, in order to provide this relative freedom of movement, it is necessary to disengage both detents 45 from the channel 7. According to the present invention, this may readily be accomplished merely by swinging each trip lever 54 down into its most compact position, namely, flat against the adjacent plates, 22 and 5, respectively. In order to limit the forward movement of the channel 7 relative to the drawbar, the rear end of the channel has a stop plate 122 bolted thereto, as best shown in Figure 1.

In order to provide for manual operation or control of the disk harrow, as, for example, may be necessary if it is hitched to the tractor not having a hydraulic power unit, all that it is necessary to do is, first, remove the link 116 by disconnecting the pins 115 and 117, which may be of the quick detachable type, the cylinder 100 having already been disconnected from the brackets 16 and 96 when the tractor having the hydraulic unit was detached from the harrow. Next, both of the trip levers 54 are swung from their disengaged position (Figure 1 and dotted lines, Figure 2) into the position indicated in Figure 3, in which each trip lever 54 extends generally upwardly and in a position to receive the rear end of controlling cables 59, it being understood that a separate cable is attached to each of the arms 54. When these members are in the position shown in Figure 3, a forward pull on each cable will disengage the latch dog or detent 39; otherwise the springs 42 continually urge the engaging sections 45 thereof into a position engaging the associated channel member 7. Therefore, when each of the levers 54 are in the position indicated in Figure 3 and cables attached thereto, the disk harrow may be controlled in the ordinary way. For example, the operator will pull both cables 59, thereby disengaging both latches. He then will back the tractor and the channel 7 into a cocked position. He will then release his hold on the cable connected with the front lever 54, permitting the detent carried by the slide 21 to engage the channel 7, and then drive the tractor forwardly while holding the rear cable so as to hold the rear detent or latch dog 39 disengaged from the channel 7 until the desired angle of gangs is reached. He will then release his hold on the cable connected with the rear trip or lever 54, which locks the channel 7 to the drawbar 2. The outfit is then arranged for operation. To straighten the gangs, all that the operator has to do is to pull on the cable connected with the lever 54 carried by the front slide 21. Forward travel of the outfit then will swing the gangs by soil resistance back into their straightened or transport position.

It will be remembered that the forward edge 46 of each of the detents or latch dogs 39 is beveled. This permits the drawbar channel 7 to be forced rearwardly merely by backing the tractor without requiring that the operator pull either of the cables 59.

While we have shown and described above the preferred structure in which the principles of the present invention have been incorporated, it is to be understood that our invention is not to be limited to the particular details shown and described above, but that, in fact, widely different means may be employed in the practice of the broader aspects of our invention.

What we claim, therefore, and desire to secure by Letters Patent is:

1. An agricultural implement comprising a pair of relatively movable parts, a latch unit for locking said parts together and including a detent carried by one part and adapted to engage the other part, and a lever movable into one position for momentarily disengaging said detent from said other part and movable into another position to continuously hold said detent disengaged from said other part.

2. In a disk harrow including shiftable gangs and a pair of relatively movable parts connected, respectively, with opposite end portions of said gangs, a pair of means adapted optionally for controlling the relative movement between said parts comprising a pair of cylinder-receiving members, one connected with one of said parts and the other connected with the other of said parts and a hydraulic cylinder and piston unit adapted to be detachably connected with said cylinder-receiving members, and a latch unit connected with one of said parts and adapted to engage the other for locking said parts against relative movement, said latch unit including a detent movable into and out of a position engaging said other part and a lever adapted, in one position, to provide a control for engaging and disengaging said detent with said other part, when said hydraulic piston and cylinder unit is detached from said cylinder-receiving members, said lever being movable into another position adjacent one of said parts so as to clear said hydraulic piston and cylinder unit when the latter is mounted on said cylinder-receiving members, and means on said lever and acting against one of said parts for holding said detent entirely disengaged from said other part whereby the relative movement between said parts may be controlled by said hydraulic piston and cylinder unit.

3. In a disk harrow including a pair of relatively movable parts, the relative position of which is to be controlled, a pair of optional means for controlling said parts, the first means including hydraulic mechanism comprising a detachable hydraulic piston and cylinder unit, and means for connecting the latter with said parts for controlling the movement of one of said parts relative to the other in both directions, said other means comprising a latch unit carried by one of said parts and including a detent movable into and out of engagement with said other part, said latch unit and said detent being formed so as to accommodate the disposition of said hydraulic mechanism closely adjacent thereto, and mechanism acting between said detent and one of said parts for holding said detent in disengaged position to provide for operation of said parts by said hydraulic piston and cylinder unit.

4. The invention set forth in claim 3, further characterized by said hydraulic mechanism including a link extending generally adjacent said relatively movable parts and said detent having recessed portions accommodating the adjacency of said link.

5. The invention set forth in claim 3, further characterized by said detent holding mechanism comprising a lever pivoted to said detent and having two cam portions, one acting against an adjacent portion of the latch unit for moving said detent when the lever is swung in a forward direction and the other acting against the latch unit for moving said detent into a released position when the lever is moved toward the latch unit in a position to clear the adjacent parts of the hydraulic mechanism.

6. In an agricultural implement, a pair of relatively movable parts, a detent pivotally mounted on one of said parts and having a movable portion engageable with the other part to control the relative movement between said parts, means forming a pivot on the movable end portion of said detent, a lever mounted on said pivot, and means forming a pair of spaced cam portions carried by the lever and reacting, respectively, against said one part whereby movement of said lever in either direction will move said detent.

7. In a disk harrow, a latch unit comprising an upper plate, a pair of lugs fixed to said upper plate, the latter having an opening therethrough, a detent pivoted at an intermediate point on said lugs and including an engaging section adapted to extend through the opening in said upper plate, and a part pivotally mounted on said detent and engageable with said upper plate for operating said pivoted detent.

8. In a disk harrow, a latch unit comprising upper and lower plates, a pair of lugs fixed to said upper plate, the latter having an opening therethrough, a detent pivoted at an intermediate point on said lugs and including an engaging section adapted to extend through the opening in said upper plate, and a part movably connected with said detent and shaped to engage said upper plate and to act against the latter when swung in either of two directions for swinging said detent in a direction to withdraw said engaging section outwardly of the opening in said upper plate.

9. In a disk harrow, a latch unit comprising an upper plate, a pair of lugs fixed to said upper plate, the latter having an opening therethrough, a detent pivoted at an intermediate point on said lugs and including an engaging section adapted to extend through the opening in said upper plate, a lug on the swinging end of said detent, a lever pivoted on said lug, spring means acting between said detent and said upper plate for urging said detent toward its engaging position and cam means on said lever operative when the latter is swung in one direction to react with said upper plate and move said detent against the action of said spring means into its disengaged position.

10. In a disk harrow, a latch unit comprising a support, a pair of lugs fixed to said support, the latter having an opening therethrough, a detent pivoted at an intermediate point on said lugs and having a swinging end including an engaging section adapted to extend through the opening in said support, a lug on the swinging end of said detent, a lever pivoted on said lug, spring means acting between said detent and said support for urging said detent toward its engaging position, and a pair of cams on said lever disposed generally on opposite sides of said pivot whereby movement of the lever in either direction acts against said detent for moving it into its disengaged position.

11. In a disk harrow or the like including a pair of relatively movable parts, one of which includes a plate, means serving as a pair of lugs disposed in laterally spaced relation on said plate with an opening in said plate between said lugs, and a detent pivoted to said lugs and movable into a position engaging the other part, said detent having a hub section extending at least partially into said opening in said plate, whereby said detent may be disposed on said plate closely adjacent thereto so as to provide a compact latching unit.

12. In a disk harrow or the like including a pair of relatively movable parts, means serving as a pair of lugs disposed in laterally spaced relation on one of said parts with an opening between said lugs, a detent pivoted to said lugs and movable into a position engaging the other part, said detent having a hub section extending at least partially into said opening, whereby said detent may be disposed on said one part closely adjacent thereto so as to provide a compact latching unit, a pivot on said detent, and an operating part mounted on said pivot and including a cam adapted, when said member is swung down against said one part, to hold said detent in a disengaged position.

13. A latch unit for a disk harrow or the like having two relatively movable parts movable one adjacent the other and one part having a plurality of detent-engaging sections, said latch unit comprising a detent, means pivotally mounting said detent on the other of said relatively movable parts, a controlling arm pivotally mounted on said detent, and means on said controlling arm and engageable with said other part for moving the detent relative to said one part so as to control its engagement with said detent-engaging sections.

CHARLES H. WHITE.
WILLIAM P. OEHLER.
CHARLES H. YOUNGBERG.

REFERENCES CITED

The following references are of record in the file of this patent:

UNITED STATES PATENTS

| Number | Name | Date |
| --- | --- | --- |
| 1,476,512 | Heston | Dec. 4, 1923 |
| 1,621,622 | Brenneis | Mar. 22, 1927 |
| 1,941,504 | White | Jan. 2, 1934 |
| 2,109,769 | Curtis | Mar. 1, 1938 |
| 2,201,240 | Mitchell | May 21, 1940 |
| 2,303,320 | Benjamin | Dec. 1, 1942 |
| 2,338,698 | White | Jan. 11, 1944 |

Certificate of Correction

May 10, 1949.

Patent No. 2,470,008.

CHARLES H. WHITE ET AL.

It is hereby certified that error appears in the printed specification of the above numbered patent requiring correction as follows:

Column 7, line 12, claim 6, after the word "movable" strike out "end"; and that the said Letters Patent should be read with this correction therein that the same may conform to the record of the case in the Patent Office.

Signed and sealed this 11th day of October, A. D. 1949.

[SEAL]

THOMAS F. MURPHY,
*Assistant Commissioner of Patents.*